United States Patent [19]

Lee

[11] Patent Number: 4,461,516
[45] Date of Patent: Jul. 24, 1984

[54] TRACK PAD REINFORCEMENT
[75] Inventor: Richard A. Lee, Warren, Mich.
[73] Assignee: The United States of America as represented by the Secretary of the Army, Washington, D.C.
[21] Appl. No.: 414,992
[22] Filed: Sep. 3, 1982
[51] Int. Cl.³ .......................................... B62D 55/18
[52] U.S. Cl. ...................................... 305/38; 305/51
[58] Field of Search ................. 305/35 R, 36, 51, 54, 305/38

[56] References Cited
U.S. PATENT DOCUMENTS

| | | |
|---|---|---|
| 1,886,839 | 11/1932 | Scheckel . |
| 1,966,450 | 7/1934 | Knox . |
| 2,369,130 | 2/1945 | Benson . |
| 2,375,170 | 5/1945 | McNeil ............................... 305/36 |
| 3,261,646 | 7/1966 | Pax .................................. 305/35 R |
| 3,542,439 | 11/1970 | Joos ................................. 305/51 X |
| 3,558,389 | 1/1971 | Bezbatchenko . |
| 3,667,529 | 6/1972 | Mirtain . |
| 3,918,506 | 11/1975 | Marzocchi . |
| 4,165,906 | 8/1979 | Fix ......................................... 305/51 |
| 4,201,260 | 5/1980 | Mirtain et al. . |

Primary Examiner—David A. Scherbel
Attorney, Agent, or Firm—Peter A. Taucher; John E. McRae; Robert P. Gibson

[57] ABSTRACT

There is disclosed an improved track shoe for use on an endless track vehicle, e.g., a military tank. The shoe includes an elastomeric pad equipped with an endless reinforcement band encircling the exposed peripheral edge surface of the elastomer to prevent such excessive pad deformation as would contribute to premature pad failure, i.e., cracking, pitting or chunking.

4 Claims, 5 Drawing Figures

TRACK PAD REINFORCEMENT

GOVERNMENT INTEREST

The invention described herein may be manufactured, used, and licensed by or for the Government for governmental purposes without payment to me of any royalty thereon.

BACKGROUND AND SUMMARY OF THE INVENTION

This invention relates to means for reinforcing elastomeric pad areas of vehicle tracks, especially tracks used on heavy military tanks weighing upwards of fifty tons. A particular aim of the invention is to provide an endless circumferential reinforcement band around the edge area of a track pad immediately adjacent the terrain-engagement surface. This endless band is designed to prevent significant outward bulging of the pad edge surface incident to high load forces on the terrain-engagement surface. By eliminating the bulge action it is believed possible to rigidify the pad and prevent internal movements within the pad that produce destructive heat and thermal degradation of the pad material. Such degradation commonly evidences itself in the form of pitting and chunking of the pad surface, i.e. small or large irregular cavities in the pad surface. A general object of my invention is to minimize this chunking tendency, to thereby increase the useful service life of the pad.

Prior art patents known to show internal reinforcement mechanism for track pads are Scheckel U.S. Pat. No. 1,886,839, Knox U.S. Pat. No. 1,966,450, Colby U.S. Pat. No. 2,012,958 and Benson U.S. Pat. No. 2,369,130. The present invention proposes a somewhat different external pad reinforcement mechanism than previously proposed. The external reinforcement comprises an endless confining band that is believed to more effectively prevent pad deformation than the known patented systems.

THE DRAWINGS

Figure 1:
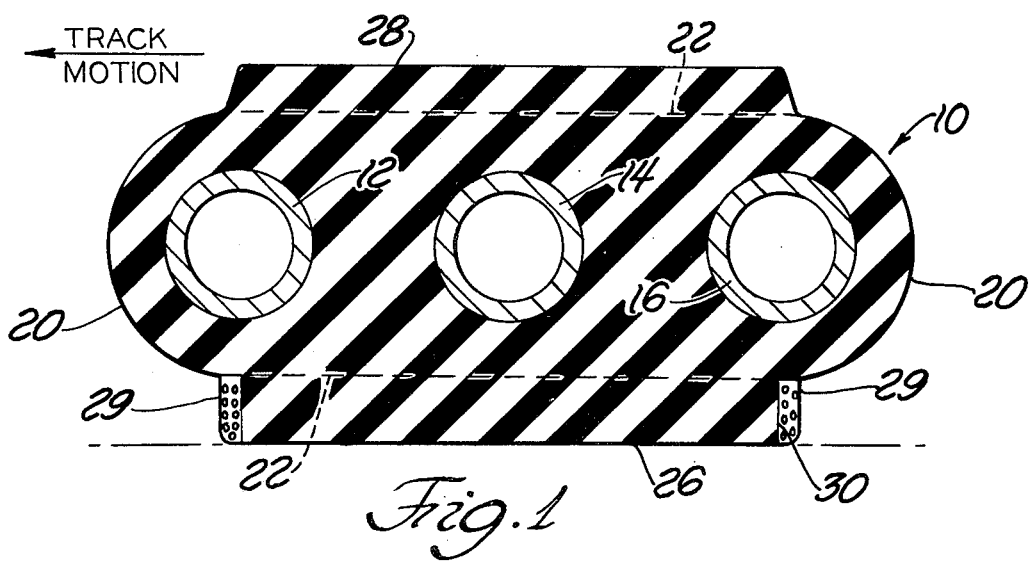
FIG. 1 is a transverse sectional view through a track shoe embodying my invention.

Referring in greater detail to FIG. 1, there is shown a track shoe 10 of generally conventional overall design. The shoe includes three circular metal tubes 12, 14 and 16 extending between two metal end plates, not readily visible in the drawings. Each end plate has an upper flat edge 22, a lower flat edge 22 and two circular end edges 20. In practice, each track section comprises two track shoes 10 arranged in side-by-side relation, as shown for example in U.S. Pat. No. 4,165,906 to J. O. Fix. Non-illustrated connector pins and elastomeric bushings extend through tubes 12 and 16 into connector links to interconnect the track sections to adjacent track sections. The various track shoes 10 making up a complete endless track are structurally identical.

In the illustrated track shoe the space between the two end plates is occupied by a resilient elastomeric pad 24 having a terrain-engagement surface 26. Upper surface 28 of the elastomeric pad is engaged by a non-illustrated wheel carried on a swingable suspension road arm in conventional fashion.

My invention is particularly concerned with a pad-reinforcement band 29 encircling the otherwise exposed edge 30 of the pad extending normal to terrain-engagement surface 26. Band 29 is non-extensible in the circumferential direction parallel to surface 26, whereby the band prevents edge 30 from outward bulge action when surface 26 is subjected to localized high load forces. Band 29 is an endless annular band extending entirely around the pad peripheral edge 30 so that band 29 is loaded essentially only in tension.

Figure 2:
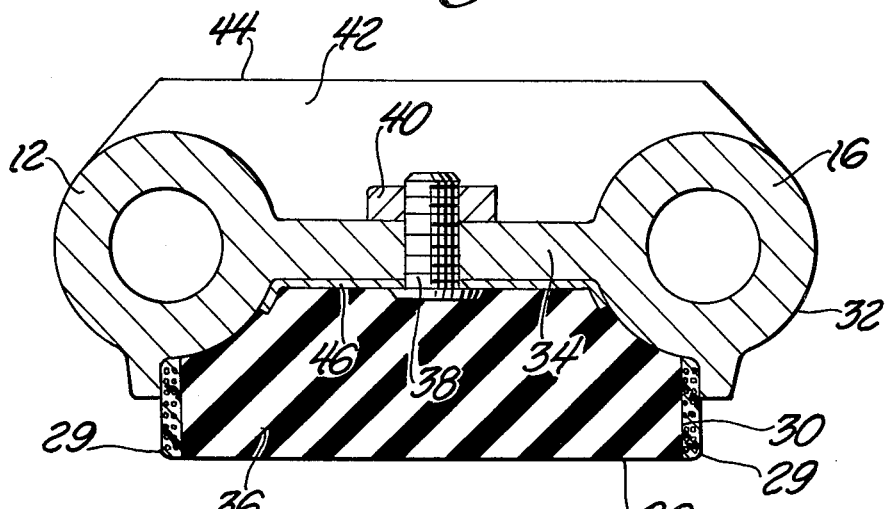
FIG. 2 is a sectional view through another track shoe utilizing my invention.

FIG. 2 illustrates a second type of track shoe embodying my invention. The shoe comprises a metal casting 32 that includes a web 34 and two tubes 12 and 16 adapted to receive non-illustrated connector pins. A resilient pad 36 is removably received in a cavity on the lower face of web wall 34 between the tube outer surfaces. Retention of the resilient pad in the cavity is accomplished by a screw or stud 38 extending from a backing plate 46 into a nut 40. The upper surface of web wall 34 has an elastomeric member 42 molded thereon to provide a flat runway surface 44 for non-illustrated road wheel.

Plate 46 and stud 38 are preferably attached to the pad by vulcanization action, e.g. while the pad is formed and cured in the mold (not shown). The resilient pad 36 in the FIG. 2 track shoe is provided with an annular reinforcement band 29 constructed similarly to the band used in the FIG. 1 track shoe.

The novel reinforcement band 29 is preferably formed as an annular rubber-coated fabric ply or belt prior to formation of pad 24 or pad 36. The uncured fabric ply pre-form is positioned as an insert in the mold used to form pad 24 or 36; therefore as the pad is formed and cured the annular fabric ply material is simultaneously reformed, cured and vulcanized to the outer surface of the pad. The annular reinforcement band is thus merged into and intimately adhered with the pad.

Band 29 preferably is formed by procedures used in tire manufacture to form carcass fabric or belt plies. Representative patents showing fabric ply materials and fabrication procedures are Bezbatchenko U.S. Pat. No. 3,558,389, Mirtain U.S. Pat. No. 3,667,529, Marzocchi U.S. Pat. No. 3,918,506 and Mirtain et al U.S. Pat. No. 4,201,260. The fabric material for band 29 comprises thin parallel cords or wires and a thin uncured rubber coating thereon. Cord material may be any conventional tire reinforcement cord such as steel, cotton, rayon, nylon, polyester, or glass fiber. The cords run circumferentially, i.e. in planes normal to the general plane of the band annulus.

Figure 3:
FIG. 3 is an enlarged fragmentary view taken through a reinforcement band used in the FIG. 1 and FIG. 2 structures.

The coated fabric may be formed into an annulus by winding the fabric on a mandrel having a profile that is the same as that of the pad surface 30 on which the band is ultimately used. As best seen in FIG. 3, the fabric may be wound around the mandrel a number of times to form a multi-ply annular preform. A solvent film may be applied to the fabric surface to provide a tacky surface suitable for adhering one ply onto another.

Figure 5:
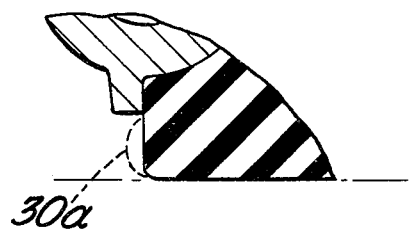
FIG. 5 is a fragmentary sectional view illustrating undesired deformation of a resilient track pad not equipped with my improved reinforcement mechanism.

The uncured annular preform may be positioned as an insert in the mold used to form pad 24 or 36. A plug or blank of uncured rubber is placed in the mold cavity so that part of the plug is surrounded by the annular preform. During pad formation and cure the multi-ply annular band 29 is vulcanized to the pad peripheral edge 30. In the finished article the fabric cords run circumferentially in planes parallel to pad surface 26, whereby the relatively inextensible cords reinforce the pad against cyclic outward bulge action as the pad is alternately loaded and unloaded. FIG. 5 illustrates the cyclic bulge effect that can be produced in a conventional pad structure not equipped with my reinforcement pad. The repeated bulging (illustrated by dashed line 30a) and relaxing of the pad edge surface produces internal mechanical movement and thermal degradation of the pad material, leading to early chunking and hole formation in the pad surface, particularly near the pad edges.

The cords in band 29 run circumferentially around the lower area of pad 36 or 24 so that the cords are placed in tension. This disposition of the cords is different than in previous reinforcing systems exemplified, for example, by Benson U.S. Pat. No. 2,369,130. In the Benson patent the tire cords are apparently arranged vertically in the road-engagement surface of the pad so that the ends of the cords are presented to the road surface, see page 1, column 2, line 50 and page 2, column 1, line 32. In Benson's system the cords are arranged in separate individual inserts 3 designed to be flexible in all directions, see page 2, column 1, line 11. The reinforcement action provided by Benson is thought to be for anti-abrasion enhancement of the pad terrain-engagement surface; there is no attempt to circumferentially confine the pad against lateral bulge effect as I propose to do.

Figure 4:
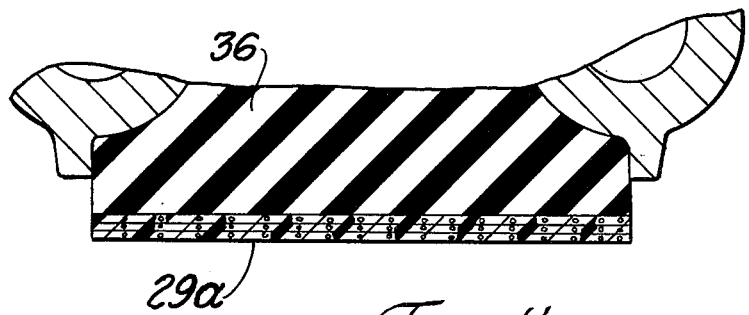
FIG. 4 is a fragmentary view through another track shoe incorporating a variant of my invention.

FIG. 4 illustrates an alternate arrangement wherein a multi-ply reinforcement cord system 29a is bonded to the lower face of the elastomeric pad to minimize pad flexibility in lateral planes. In this arrangement the cords in each ply or adjacent plies cross one another to achieve a stiffener action in all lateral directions; cords extend primarily in the lateral plane, rather than normal to the pad surface as proposed in the aforementioned Benson patent. The cord system 29a is bonded to the elastomeric pad along its entire face, as for example by vulcanization during the pad cure period.

Cord system 29a adds to the abrasion resistance of the pad and also rigidifies the pad in lateral directions, thereby somewhat minimizing the undesired internal mechanical motions that produce the cyclic bulging effect and thermal degradation effect.

In each of the illustrated systems the reinforcing cord mechanism wears out during service. In the arrangements of FIGS. 1 and 2 the cords wear out along with the pad elastomeric surface. In the FIG. 4 system the reinforcement cords wear out prior to any wear action of the elastomeric pad. It can be visualized that combinations of the FIG. 2 and FIG. 4 systems are possible, i.e. reinforcement cord systems on both the pad circumferential edge 30 and terrain-engagement surface 26.

I wish it to be understood that I do not desire to be limited to the exact details of construction shown and described for obvious modifications will occur to a person skilled in the art.

I claim:

1. In a track shoe for an endless track adapted to move a vehicle over terrain, said shoe comprising a resilient elastomeric pad having a flat terrain-engagement surface and an endless annular edge surface extending generally normal to said terrain-engagement surface: the improvement comprising an endless pad-reinforcement band adhered to said edge surface for precluding significant outward bulge of said edge surface when the terrain-engagement surface is subjected to high load forces; said band having a width dimension that corresponds to the width dimension of the annular edge surface whereby the band entirely confines and surrounds the edge surface; said band comprising reinforcement cords extending in a circumferential direction parallel to the flat surface of the pad, whereby the pad is substantially non-deformable in planes parallel to the terrain-engagement surface.

2. The improvement of claim 1: said reinforcement cords being formed of a material selected from steel, cotton, rayon, nylon, polyester, and glass fiber.

3. The improvement of claim 2 wherein the cords are rubber-coated; said rubber-coated cords being adhered to the edge surface of the pad by vulcanization incident to pad cure operation.

4. The improvement of claim 3 wherein the rubber-coated cords are wound around the pad edge surface at least three times to form a multi-ply edge-reinforcement band.

* * * * *